United States Patent
Frazier et al.

(10) Patent No.: US 9,022,692 B2
(45) Date of Patent: May 5, 2015

(54) SYSTEM FOR UNDERWATER COMPRESSED FLUID ENERGY STORAGE AND METHOD OF DEPLOYING SAME

(75) Inventors: Scott Raymond Frazier, Golden, CO (US); Brian Von Herzen, Minden, NV (US)

(73) Assignee: Bright Energy Storage Technologies, LLP, Arvada, CO (US)

(*) Notice: Subject to any disclaimer, the term of this patent is extended or adjusted under 35 U.S.C. 154(b) by 445 days.

(21) Appl. No.: 12/888,971

(22) Filed: Sep. 23, 2010

(65) Prior Publication Data

US 2011/0070031 A1    Mar. 24, 2011

Related U.S. Application Data

(60) Provisional application No. 61/245,279, filed on Sep. 23, 2009, provisional application No. 61/309,415, filed on Mar. 1, 2010, provisional application No. 61/364,364, filed on Jul. 14, 2010, provisional application No. 61/364,368, filed on Jul. 14, 2010.

(51) Int. Cl.
*E02D 29/00* (2006.01)

(52) U.S. Cl.
CPC ............. *E02D 29/10* (2013.01); *Y02E 10/38* (2013.01); *Y02E 60/17* (2013.01)

(58) Field of Classification Search
USPC .................... 405/19, 210; 114/257; 383/3
See application file for complete search history.

(56) References Cited

U.S. PATENT DOCUMENTS

| | | | |
|---|---|---|---|
| 3,282,361 A * | 11/1966 | Mackie | 180/124 |
| 3,670,839 A | 6/1972 | Savit | |
| 3,783,615 A | 1/1974 | Hubers | |
| 3,797,973 A | 3/1974 | Prasse et al. | |
| 3,866,058 A | 2/1975 | Lenssen | |
| 3,883,273 A | 5/1975 | King | |
| 3,895,493 A | 7/1975 | Rigollot | |
| 3,896,898 A | 7/1975 | Kirby et al. | |
| 3,916,634 A | 11/1975 | Woodruff | |
| 3,970,050 A | 7/1976 | Hoadley | |
| 3,996,741 A | 12/1976 | Herberg | |
| 4,206,601 A | 6/1980 | Eberle | |
| 4,232,983 A | 11/1980 | Cook et al. | |
| 4,245,475 A | 1/1981 | Girden | |
| 4,289,425 A | 9/1981 | Ootsu | |
| 4,391,552 A | 7/1983 | O'Hara | |
| 4,454,721 A | 6/1984 | Hurlimann et al. | |
| 4,555,201 A * | 11/1985 | Paoluccio | 405/117 |
| 4,560,884 A | 12/1985 | Whittecar | |
| 4,848,445 A | 7/1989 | Harper | |
| 4,873,828 A | 10/1989 | Laing et al. | |
| 4,958,956 A * | 9/1990 | Tanaka et al. | 405/23 |

(Continued)

FOREIGN PATENT DOCUMENTS

| | | |
|---|---|---|
| CA | 2027113 A1 | 4/1992 |
| EP | 1638191 A2 | 3/2006 |

(Continued)

*Primary Examiner* — Tara M. Pinnock
(74) *Attorney, Agent, or Firm* — Ziolkowski Patent Solutions Group, SC

(57) ABSTRACT

A system and method for underwater compressed fluid energy storage include a compressed fluid storage system that comprises a fluid containment vessel positioned on a floor of a body of water, wherein the fluid containment vessel comprises sediment positioned therein to ballast the vessel on the floor.

6 Claims, 9 Drawing Sheets

(56) References Cited

U.S. PATENT DOCUMENTS

| | | | |
|---|---|---|---|
| 5,158,395 A * | 10/1992 | Holmberg | 405/21 |
| 5,184,936 A | 2/1993 | Nojima | |
| 5,205,720 A | 4/1993 | Nagata | |
| 5,340,283 A | 8/1994 | Nagata | |
| 5,391,067 A | 2/1995 | Saunders | |
| 5,537,822 A | 7/1996 | Shnaid et al. | |
| 5,841,733 A | 11/1998 | Bouyoucos et al. | |
| 5,946,909 A | 9/1999 | Szpur | |
| 6,018,947 A | 2/2000 | DeMarco et al. | |
| 6,056,438 A * | 5/2000 | Bradley | 383/66 |
| 6,296,420 B1 * | 10/2001 | Garbiso | 405/111 |
| 6,575,712 B1 | 6/2003 | Slavchev | |
| 6,659,065 B1 | 12/2003 | Renegar | |
| 6,675,734 B2 * | 1/2004 | Eagles et al. | 114/256 |
| 6,748,737 B2 | 6/2004 | Lafferty | |
| 6,863,474 B2 | 3/2005 | Webster et al. | |
| 6,964,165 B2 | 11/2005 | Uhl et al. | |
| 7,097,436 B2 | 8/2006 | Wells | |
| 7,216,483 B2 | 5/2007 | Takeuchi | |
| 7,281,371 B1 | 10/2007 | Heidenreich | |
| 7,357,598 B1 * | 4/2008 | Bradley | 405/15 |
| 7,362,490 B2 | 4/2008 | Park | |
| 7,470,086 B2 | 12/2008 | Jennings et al. | |
| 7,525,212 B1 | 4/2009 | Catlin | |
| 7,614,861 B2 | 11/2009 | Nagler | |
| 7,775,171 B2 * | 8/2010 | Tupil | 114/74 R |
| 2002/0119010 A1 | 8/2002 | Len-Rios | |
| 2002/0178987 A1 | 12/2002 | Eagles et al. | |
| 2004/0074235 A1 | 4/2004 | Lampkin et al. | |
| 2004/0191000 A1 * | 9/2004 | Webster et al. | 405/210 |
| 2005/0158184 A1 | 7/2005 | Lin | |
| 2007/0089682 A1 | 4/2007 | Mariansky | |
| 2007/0130929 A1 | 6/2007 | Khan et al. | |
| 2007/0234749 A1 | 10/2007 | Enis et al. | |
| 2007/0295673 A1 | 12/2007 | Enis et al. | |
| 2008/0012344 A1 | 1/2008 | Buffard et al. | |
| 2008/0034756 A1 | 2/2008 | Spalte | |
| 2008/0226480 A1 | 9/2008 | Ferran et al. | |
| 2008/0260548 A1 | 10/2008 | Ahdoot | |
| 2009/0021012 A1 | 1/2009 | Stull et al. | |
| 2009/0178384 A1 | 7/2009 | Nakhamkin | |
| 2009/0230696 A1 | 9/2009 | Enis et al. | |

FOREIGN PATENT DOCUMENTS

| | | |
|---|---|---|
| EP | 1734255 A1 | 12/2006 |
| GB | 1213112 A | 11/1970 |
| GB | 2013318 A | 8/1979 |
| GB | 2020375 A | 11/1979 |
| JP | 63-239319 A | 10/1988 |
| JP | 63-253123 A | 10/1988 |
| JP | 03-149322 A | 6/1991 |
| JP | 10-292406 A | 11/1998 |
| JP | 2002-205685 A | 7/2002 |
| JP | 2005-030010 A | 2/2005 |
| JP | 2008-080186 A | 4/2008 |
| SG | 140509 A1 | 3/2008 |
| WO | 7901154 A1 | 12/1979 |
| WO | 7901158 A1 | 12/1979 |
| WO | 0133150 A1 | 5/2001 |
| WO | 03078812 A1 | 9/2003 |
| WO | 2008045468 A1 | 4/2008 |
| WO | 2008106967 A1 | 9/2008 |
| WO | 2009005383 A1 | 1/2009 |
| WO | 2009015419 A1 | 2/2009 |
| WO | 2009024933 A2 | 2/2009 |

* cited by examiner

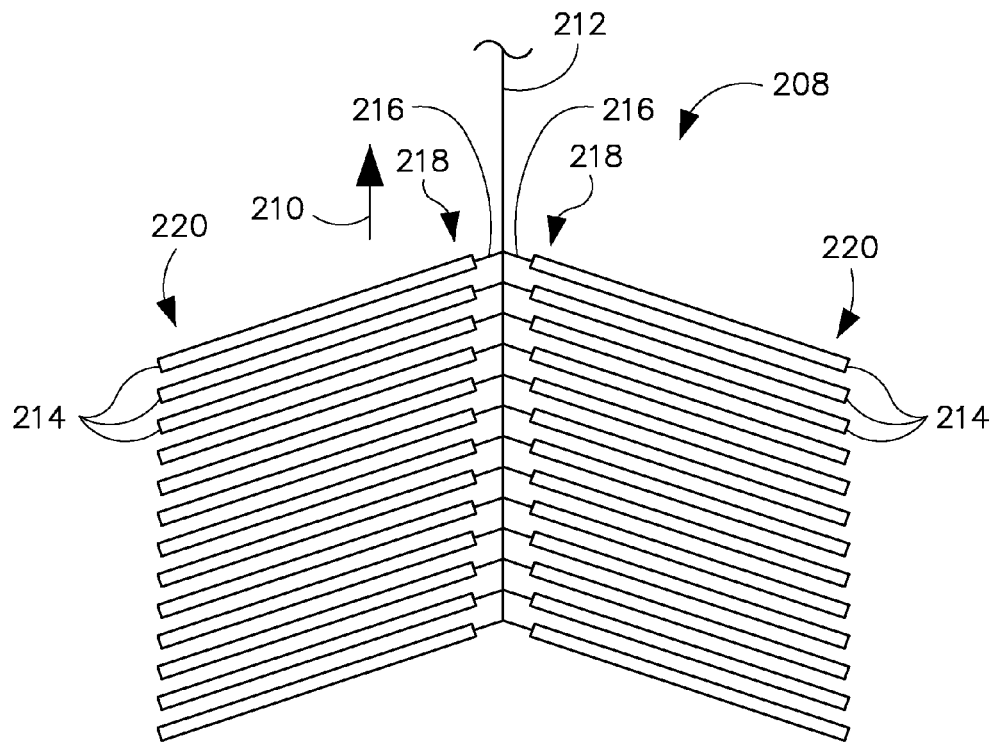
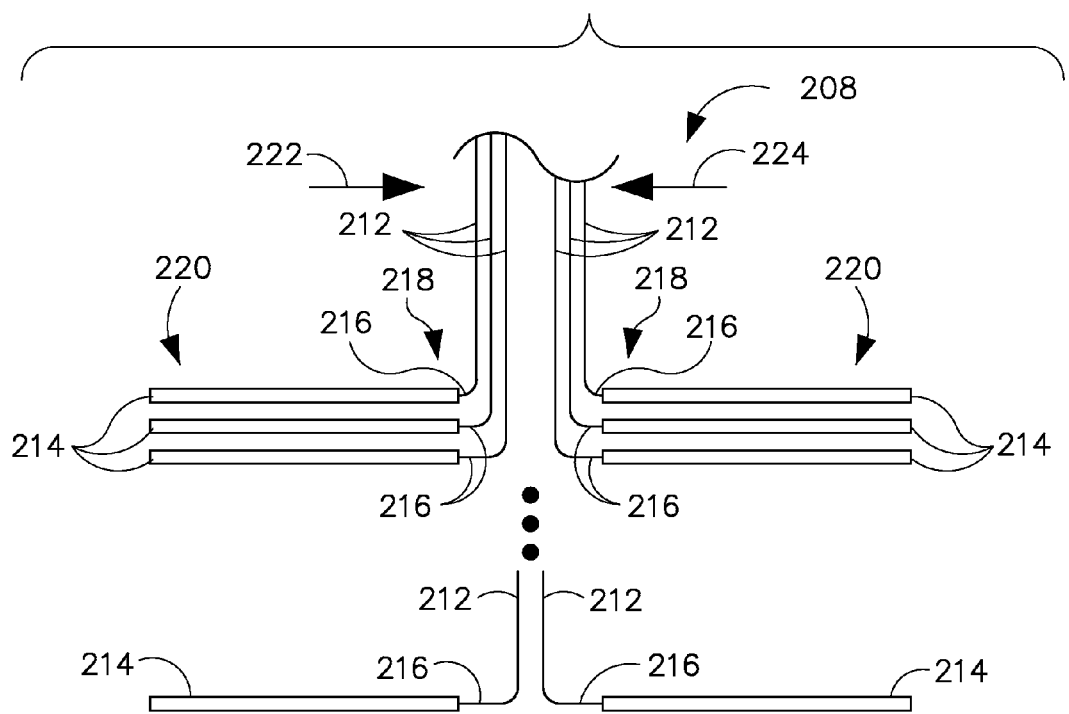

SYSTEM FOR UNDERWATER COMPRESSED FLUID ENERGY STORAGE AND METHOD OF DEPLOYING SAME

CROSS-REFERENCE TO RELATED APPLICATION

The present application claims priority to U.S. Provisional Application 61/245,279 filed Sep. 23, 2009, to U.S. Provisional Application 61/309,415 filed Mar. 1, 2010, to U.S. Provisional Application 61/364,364 filed Jul. 14, 2010, and to U.S. Provisional Application 61/364,368 filed Jul. 14, 2010, the disclosures of which are incorporated herein.

BACKGROUND OF THE INVENTION

Embodiments of the invention relate generally to compressed fluid energy storage and, more particularly, to a method and apparatus of storing compressed fluid in an underwater storage device and extracting energy therefrom. In embodiments where the fluid compressed is air, such inventions are part of a class of energy storage systems known as compressed air energy storage (CAES) systems, but in this document we will use CAES to refer generically to any compressed fluid energy storage system.

Renewable energy (RE) sources offer an alternative to conventional power sources in an age of dwindling non-renewable energy sources and high carbon emissions. However, RE sources are often not fully exploited because many forms of renewable energy are not available when the peak demand is present. For instance, RE sources may be most available during undesirable off-peak hours, or may be located in areas that are remote from population centers or locations where power is most needed, having to share the grid during peak hours along with all the other peak power sources.

RE sources may include hydro power, geothermal, Ocean Thermal Energy Conversion (OTEC), as examples. Hydro power, for instance, when combined with a reservoir is one RE source that can be throttled up and down to match or load-follow the varying power loads. Geothermal and OTEC are also good baseload RE resources; however, locations viable for their use tend to be limited. It is to be understood that an ocean thermal energy converter, while traditionally utilized across the thermocline of an ocean, can additionally apply to fresh bodies of water that have a temperature difference between surface water and deep water. RE sources may also include solar, wind, wave, and tidal, as examples. However these sources tend to be intermittent in their ability to provide power. Energy storage is thus desired for those sources to substantially contribute to the grid energy supply.

For instance, wind energy may be cost effective on a cost per kWh but does not may not produce energy when it's needed. It faces impediments to even modest grid penetration levels largely due to the timing of its power output, which is not only not dispatchable according to the demands of the grid, but it varies uncontrollably according to wind levels. This problem will get worse as more RE sources of all kinds are added to the grid—as long as cost effective storage is unavailable. Above 20% renewable energy fraction, electrical power grids often lose stability without energy storage to modulate energy supply and demand.

Cost-effective storage for the electrical grid has been sought from the beginning of electrical service delivery but is not yet available. The variation in power demand throughout a day, and season-to-season, requires having generation assets that are utilized only part of the time, which can increase capital, operations, and maintenance costs for assets used at less than full capacity. Also some generation assets are difficult to throttle or shut down and are difficult to return to full power in short periods of time. Energy storage can provide a buffer to better match power demand and supply allowing power sources to operate at higher capacity and thus higher efficiency.

Cost parameters of several leading storage technologies may be considered for large scale energy systems and each technology has its own cost drivers. Pumped hydroelectric, for example, has been used for many decades and is often considered the standard by which other grid energy storage ideas are judged. It is efficient from an energy capacity standpoint, consumes no fuel upon harvesting the stored energy, but can only be deployed in limited locations and has high capital cost per unit power. A substantial elevation change and two reservoirs are typically required. Also, most of the viable sites in North America are considered to be already developed, so, regardless of cost, it does not appear that pumped hydroelectric will be able to contribute much additional energy storage capacity. It is also fairly expensive in terms of power cost ($/kW) but nonetheless is widely used when available due to fairly inexpensive cost per unit energy ($/kWh).

CAES is an attractive energy storage technology that overcomes many drawbacks of known energy storage technologies. A conventional approach for CAES is to use a customized gas turbine power plant to drive a compressor and to store the compressed air underground in a cavern or aquifer. The energy is harvested by injecting the compressed air into the turbine system downstream of the compressor where it is mixed with, or heated by natural gas-fired combustion air and expanded through the turbine. The system operates at high pressure to take advantage of the modest volume of the cavern or aquifer. The result is a system that operates with constant volume and variable pressure during the storage and retrieval process, which results in extra costs for the compressor and turbine system because of the need to operate over such a wide range of pressures. Underground CAES suffers from geographic constraints. Caverns may not be located near power sources, points of load or grid transmission lines. In contrast, over 90% of the electrical load in the industrialized world lies within reach of water deep enough for underwater CAES to be practical. Underwater CAES removes many of the geographic constraints experienced by underground CAES.

Also, an important factor for efficient compression and expansion of a fluid is dealing with the heat generated during compression and the heat required during expansion. Conventional CAES reheats air using combustion of natural gas (often by absorbing heat from the gas turbine exhaust) and gives up the heat of compression to the ambient environment. Such systems can include a thermal storage device to enable adiabatic operation. Such systems also often have separate equipment for compression and expansion phases, and therefore have a greater capital expense, as well as higher operating cost and complexity due to the use of natural gas. The result is that the power plant, when utilizing purchased off-peak power to charge the air reservoir can generate power during periods of peak demand, but with additional equipment and higher fuel costs.

Therefore, it would be desirable to design an apparatus and method of storing and recovering energy in a compressed fluid energy storage system in a more efficient and cost-effective manner, without need for external fuel, that is competitive with conventional power sources.

BRIEF DESCRIPTION OF THE INVENTION

In accordance with one aspect of the invention, a compressed fluid storage system comprises a fluid containment vessel positioned on a floor of a body of water, wherein the fluid containment vessel comprises sediment positioned therein to ballast the vessel on the floor.

According to another aspect of the invention, a method of deploying a compressed fluid storage system includes pumping a sediment mixture into a flexible fluid storage bag, wherein the sediment mixture comprises sediment acquired from a floor of a body of water. The method also includes allowing the sediment mixture to settle in the flexible fluid storage bag such that sediment from the sediment mixture ballasts the flexible fluid storage bag on the floor and coupling the flexible fluid storage bag to a compression unit via a fluid hose, wherein the compression unit is configured to deliver compressed fluid to the flexible fluid storage bag for storage.

According to yet another aspect of the invention, a compressed fluid storage system includes a fluid storage system positioned on a floor under a body of water, the fluid storage system comprising a plurality of flexible fluid storage tubes partially filled with a sediment ballast. A fluid pressure conversion system is included that is configured to pressurize a quantity of fluid from a first pressure to a higher, second pressure. The system also includes a power source coupled to the fluid pressure conversion system and configured to cause the fluid pressure conversion system to pressurize the quantity of fluid and a pressurized-fluid conveyance system configured to pass pressurized fluid between the fluid pressure conversion system and the fluid storage system.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 19 is a schematic diagram showing a fluid storage tube assembly arrangement according to an embodiment of the invention.

FIG. 20 is a schematic diagram showing a fluid storage tube assembly arrangement according to an embodiment of the invention.

DETAILED DESCRIPTION

Embodiments of the invention include deployment or installation of compressed fluid storage vessels on a floor of an ocean, sea, lake, reservoir, gulf, harbor, inlet, river, or any other manmade or natural body of water. As used herein, "sea" refers to any such body of water, and "sea floor" refers to the floor thereof. "Fluid," as used herein, refers to any compressible gas or liquid such as air, CO2, or the like as well as to a supercritical fluid. "Sediment" (e.g., "sea floor sediment"), as used herein, refers to marine material from the bottom or sea floor of the sea and may include, by way of example, gravel, sand, silt, clay, mud, organic or other material settled onto the floor of the sea.

In disclosed embodiments of the system, compressed fluid is stored in a bag in (or referred to as 'under') a body of water. Hydrostatic pressure of surrounding water becomes the predominant restraining parameter for the compressed fluid, which is pressurized into the bag via a compressor. In traditional "pumped hydro" storage, water is pumped through a substantial geographic elevation. In contrast, in embodiments of the disclosed system, the level of a body of water is essentially lifted through the mechanism of adding fluid below it. The technology applies equally well to an ocean or an inland lake or reservoir. The disclosed system often operates at lower pressure ratios than traditional CAES (based on the depth of the water), and these lower pressure ratios and use of the water as a vast heat sink, in several embodiments as will be discussed, eliminates the need for fossil fuels to reheat the fluid immediately prior to or during the expansion phase. Also, the system operates with a nearly constant storage pressure allowing simpler and more efficient compressor/expander (C/E) designs.

Figure 1:
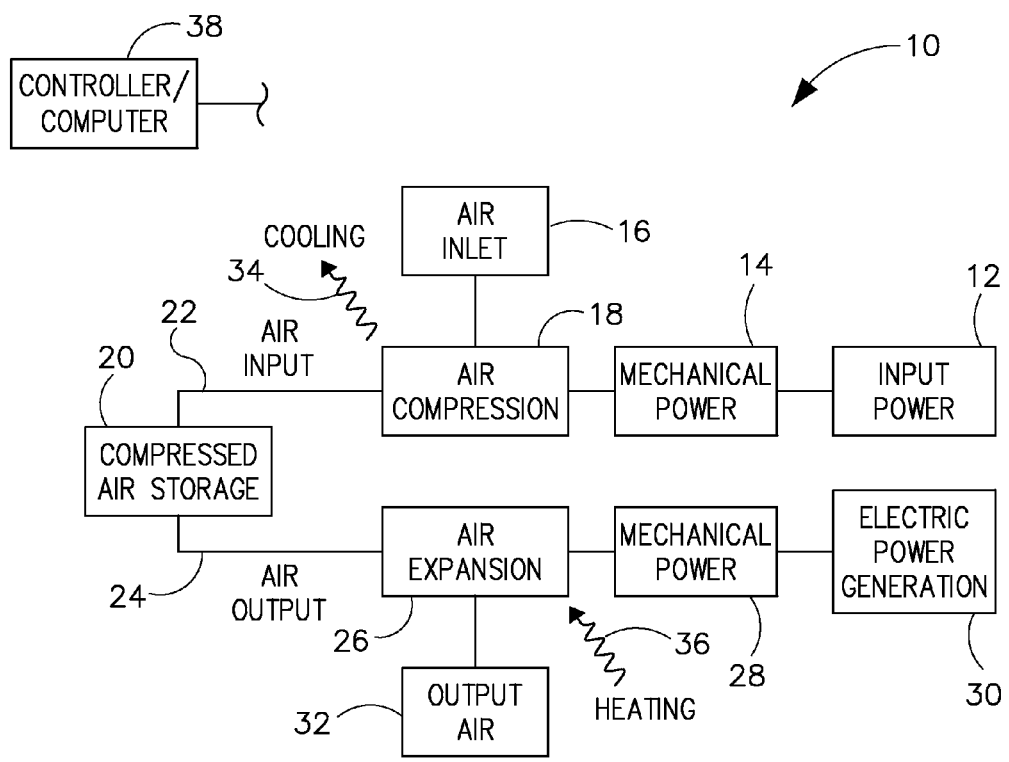
FIG. 1 is a schematic diagram illustrating general functionality of embodiments of embodiments of the invention.

Referring now to FIG. 1, a general functionality of embodiments of the disclosed system is illustrated. System 10 includes input power 12 which can be, in embodiments of the invention, from a renewable energy source such as wind power, wave power (e.g., via a "Salter Duck"), current power, tidal power, or solar power, as examples. In another embodiment, input power 12 may be from an electrical power grid. In the case of a renewable energy (RE) source, such a source may provide intermittent power. In the case of an electrical power grid, system 10 may be connected thereto and controlled in a fashion that electrical power may be drawn and stored as compressed fluid energy during off-peak hours such as during late evening or early morning hours, and then recovered during peak hours when energy drawn from system 10 may be sold at a premium (i.e., electrical energy arbitrage), or to augment base load power systems such as coal to provide peaking capability by storing inexpensive base load power. Another way of operating would be to use system 10 as a base power supply to provide low-cost power therefrom in a generally static mode in lieu of a conventional power source such as coal, and use conventional power sources (e.g., natural gas, diesel, etc. . . . ) as peak power systems to provide transient power as the load fluctuates and exceeds the supply from system 10, thus reducing the average cost of power.

Also, system 10 is not limited to the aforementioned power sources, but applicable to any power source, including intermittently available power sources, or sources from which may be drawn during low-cost or off-peak hours and sold during a period that is desirable, such as during a peak electrical load or generating-plant outage. Further, system 10 is not limited to a single input power 12 but may include multiple sources which may be coupled thereto. In other words, multiple and combined power sources may be included in a single system as input power 12. Input power 12 is coupled to mechanical power 14 to compress fluid from a fluid inlet 16.

Fluid compression 18 may be from a device that can both compress and expand a fluid, depending on direction of rotation, such as a Wankel-type compressor/expander (C/E). However, the invention is not so limited, and any compressor that uses mechanical power to compress a fluid may be implemented according to embodiments of the invention, and any expander that decompresses a fluid to generate mechanical energy may be implemented according to embodiments of the invention. In embodiments of the invention the C/E is capable of generating between 0.2 MW and 3 MW of power; however, the invention is not so limited and may be capable of generating any range of power commensurate with system requirements that may include a power as low as 0.0001 MW and a power as high as 5 MW or greater. Thus, fluid compression 18 occurs as a result of mechanical power 14 using fluid input 16. Fluid compression 18 may occur in one or multiple cycles, and cooling may be introduced via pumps and heat exchangers, between stages, as is known in the art. Cooling may also be achieved through direct contact between the compressed fluid and a cooling fluid. Fluid from fluid compression 18 is conveyed to compressed fluid storage 20 via a fluid input 22. Also, compressed fluid storage 20 may be a bag or other conformal fluid containment device that may be ballasted within a body of water such as a lake, reservoir (natural or man-made), or sea, using sediment as ballast, and at a depth to which fluid may be compressed and stored for later extraction. As such, the volume of fluid is stored nearly isobarically as a function of the amount of fluid therein and as a function of its depth within the body of water.

The fluid storage bags or tubes may be rated to 50° C. In one compressor design according to an embodiment of the invention, where the heat of compression is recovered and stored, the expected exit temperature of the fluid from the expander into the fluid hose is only about 5.5° C. above the water temperature. Where only ambient water is used to cool the compression stages and there is no heat exchanger after the final stage, the temperature of the fluid into the fluid hose may be 30° C. above ambient, or 45° C. in the case of a 15° C. surface ocean temperature. If the tube temperature limit is exceeded for any reason, a temperature alarm can shut down the compressor. One or more temperature sensors may be positioned along the length of a fluid storage tube in a CAES system such that the temperature of the fluid storage tube may be monitored. For example, a temperature alarm may indicate to a system operator that a temperature limit has been reached or exceeded. In addition, an alarm shutdown on the system compressor may cause the compressor to stop supplying compressed fluid to the affected fluid tube to lessen or prevent damage to the fluid storage tube or to the fluid hose connected to the affected fluid storage tube. The bag experiences constant pressure due to the variable-volume design and thus no additional heating occurs within the bag.

When it is desirable to draw stored energy from system 10, compressed fluid may be drawn from compressed fluid storage 20 via fluid output 24 and fluid expansion 26 occurs. As known in the art, fluid expansion 26 results in available energy that may be conveyed to, for instance, a mechanical device, which may extract mechanical power 28 for electrical power generation 30, which may be conveyed to a grid or other device where it is desirable to have electrical power delivered. Outlet fluid 32 is expelled to the environment at generally standard or ambient pressure. In embodiments of the invention, mechanical power 28 may be produced from, as an example, a Wankel-type expander. Further, as will be discussed, mechanical power 14 for fluid compression 18 and mechanical power 28 derived from fluid expansion 26 may be via the same device (i.e., a compression/expansion or "C/E" device) or via a different or separate device within system 10.

In principle, a C/E may be used in an isothermal operation, an adiabatic operation, or a combination thereof. In another example, a C/E may be implemented that does not use a distinct heat exchanger and does not use a thermal reservoir. As is known in the art, when a fluid is compressed, it heats, and when a fluid is expanded, it cools. As such, embodiments of the invention include forced-convection cooling 34 to cool the fluid from fluid compression 18 and forced-convection heating 36 to heat the fluid from fluid expansion 26. Because fluid storage occurs at generally ambient temperature and pressure (i.e., at depth within the body of water as discussed), both cooling 34 for fluid compression 18 and heating 36 after fluid expansion 26 may be performed using the vast amount of fluid that surrounds system 10 (i.e., lake or seawater). As such, system 10 may be operated, in some embodiments, in a generally isothermal manner that cools the fluid to near ambient during compression stage(s) and heats the fluid to near ambient during expansion stage(s). In other embodiments, system 10 may be operated in a generally adiabatic manner where energy from compression is stored via a controlled heat transfer process to a thermal storage tank, and energy to heat the fluid after expansion is likewise drawn from the energy stored in the storage tank, having relatively little heat exchange with the surrounding environment. In such fashion, the system includes a way to modulate or recover the sensible heat in the compressed fluid. However, in either case, pumps and heat exchangers may be employed to cool at desired locations in the system, as understood in the art.

In yet another embodiment, energy from fluid compression 18 is not stored per se, but water is selectively drawn into system 10 by taking advantage of the natural temperature difference between the surface water temperature and the temperature in the depths. In such an embodiment, cooling 34 during fluid compression 18 may be performed using relatively cold water obtained from the depths (i.e., well below water surface), and heating 36 during fluid expansion 26 may be performed using relatively warm water obtained from near the water surface. Utilizing this temperature difference in this manner is actually adding a heat engine cycle on top of the energy storage cycle, thus making it conceivable that more energy would be extracted than was stored, due to the thermal energy input of the water body.

System 10 includes a controller or computer 38 which may be controllably linked to components of system 10.

Figure 2:
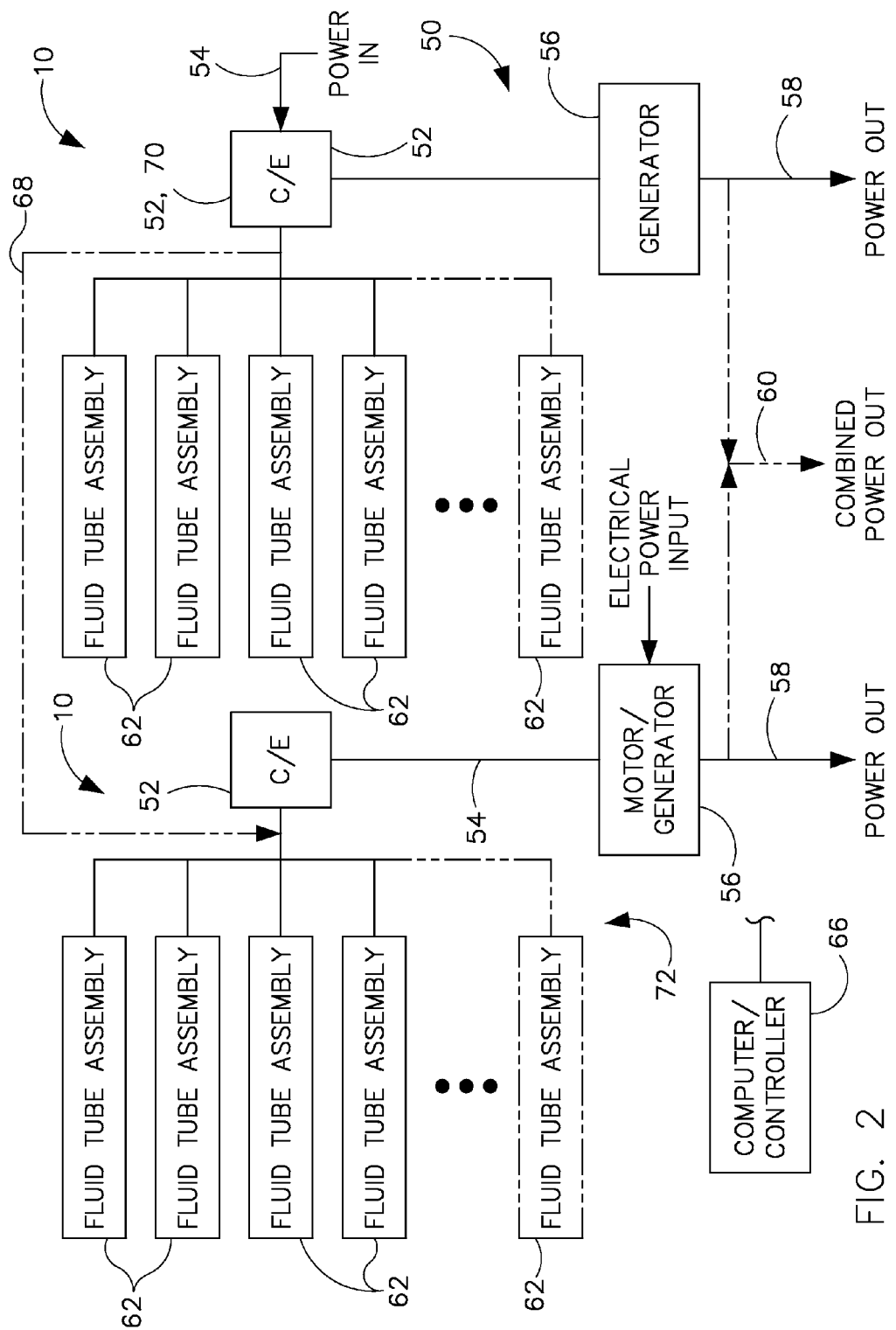
FIG. 2 is a schematic diagram illustrating a system having the functionality illustrated in FIG. 1 according to embodiments of the invention.

Referring now to FIG. 2, multiple systems such as system 10 of FIG. 1 may be deployed according to an embodiment of the invention. As will be described in further detail with respect to additional figures below, each system 10 may include a unitary or bi-directional compressor/expander (C/E) unit that is coupled to a fluid storage tube assembly that is positioned well below the surface of a water body. Each C/E is coupled to an energy source and a generator. The energy source may be a renewable source such as wind or wave power, or it may be from the generator itself, which is caused to operate as a motor having energy drawn from a power grid or from a renewable source such as a solar photovoltaic array.

Thus, FIG. 2 illustrates an overall system 50 having a plurality of systems 10 as illustrated in FIG. 1 and in subsequent figures and illustrations. Each system 10 includes a C/E 52 configured having a power input 54 and also coupled to a generator 56 (or motor/generator). Each generator 56 is configured having a respective power output 58. In one embodiment, each power output 58 is coupled separately to a load or utility grid; however, in another embodiment as illustrated, multiple power outputs 58 from two or more generators 56 may be combined to output a combined power output 60 to a load or utility grid.

Each C/E 52 is coupled to a fluid storage tube assembly 62, which, as will be further discussed, is positioned at depth and is configured to receive compressed fluid from a respective C/E 52. According to embodiments of the invention, each C/E 52 may be coupled to multiple fluid storage tube assemblies 62 via a tube or pipe 64. As such, a single C/E 52 may be coupled to a vast number of fluid-storage assemblies 62 and may be limited by the number of feed lines and the terrain on which the fluid storage tube assemblies 62 are positioned, as examples. Operation of overall system 50 may be controlled via a computer or controller 66, and one skilled in the art will recognize that each system 10 may include control valves, pressure sensors, temperature sensors, and the like, distributed throughout. Controller 66 is configured to pressurize fluid and direct the pressurized fluid to pass from C/E 52 or stages thereof to fluid storage tube assemblies 62 when power is available from the power source, and direct the pressurized fluid to pass from fluid storage tube assemblies 62 to C/E 52 or stages thereof and expand the pressurized fluid when power is selectively desired to be drawn from fluid storage tube assemblies 62.

As such, overall system 50 may be deployed in a modular fashion having multiple systems 10 (only two of which are illustrated in FIG. 2). Accordingly, this modularity provides system resilience and an ability to swap units in the field with minimum overall system downtime by allowing a portion of the system to be taken offline while the rest of the system continues to operate. Modularity also enables separate systems to operate simultaneously in different modes (i.e., one system collects/stores energy while another generates power). Thus, multiple CEs may be ganged together, as illustrated in FIG. 2, enabling modularity. And, each system 10 may be controlled in a fashion where, for instance, an individual fluid storage tube assembly 62 may be decoupled or isolated from its respective C/E 52. Accordingly, during operation, individual systems 10 or components of an individual and specific system 10 may be removed from service for trouble-shooting, repair, or routine maintenance. Thus, the modularity provides ease of servicing that enhances overall reliability, since the overall system 50 would not need to be shut down for servicing.

Further, because of the modularity of overall system 50, additional systems 10 may be added incrementally thereto, or additional storage may be added to each system 10 during operation. Thus, as power demands change over time (i.e., population growth or decrease in a given service area), power and/or storage capacity may be added or removed in a modular fashion consistent with that illustrated in FIG. 2, over time and in concert with changing system requirements. Thus, a modular system is expandable and other systems may be constructed and brought online with minimal impact to overall system downtime and operation.

Additionally, systems 10 of overall system 50 may be operated in separate fashions from one another simultaneously. For instance, in one portion of an array of systems 10, one of the systems 10 may be exposed to a high wind and thus operated in compression mode to store energy therefrom in its respective fluid storage tube assembly 62. However, at the same time, another one of the systems 10 may be in an area receiving little or no wind and thus operated in expansion mode to draw energy from its respective fluid storage tube assembly 62.

As such, overall system 50 may be operated in a flexible fashion that allows multiple modes of operation, and also may be configured in a modular fashion to allow portions thereof to be temporarily shut down for maintenance, repair, and operation, or permanently decommissioned, without having to shut down the overall system 50.

Further, configuration and operation of overall system 50 is in no way limited to the examples given. For instance, instead of wind energy, systems 10 may be coupled to a wave energy source or a water current source, as further examples. Systems 10 may each employ multiple C/Es 52, or C/Es 52 may be configured to share fluid storage therebetween. Thus, in one example, an auxiliary feed line 68 may be positioned and configured to separately couple one C/E 70 of one system 10 with fluid storage tube assemblies 72 of another system. In such fashion, storage capacity of fluid storage tube assemblies 72 may be used during, for instance, repair or maintenance of one C/E 70. In addition, rerouting, an example of which is shown in feed line 68, enables the cooperative use of multiple C/E's 52 and 70 to additional advantage, including modularity, system resilience, incremental expandability of power capacity, field-swappability of C/E units, and the ability to operate one C/E in compression mode and another C/E in expansion mode. These advantages result in a system with graceful degradation, no single point of failure of the entire system, and flexibility to add capability as power and storage requirements increase. It also enables a flow-through mode of operation where power from a prime mover (such as a wind generator, a wave power generator (e.g., via a "Salter Duck"), a current power generator, a tidal power generator, and an ocean thermal energy converter, as examples) passes through a first C/E, compressing fluid, is optionally stored, and passes through a second C/E in expansion mode, generating power for the grid. Such an embodiment eliminates ramp/up and ramp/down time for the system, enabling a standby mode of operation that is ready to absorb power or deliver it on demand without delay.

Figure 3:
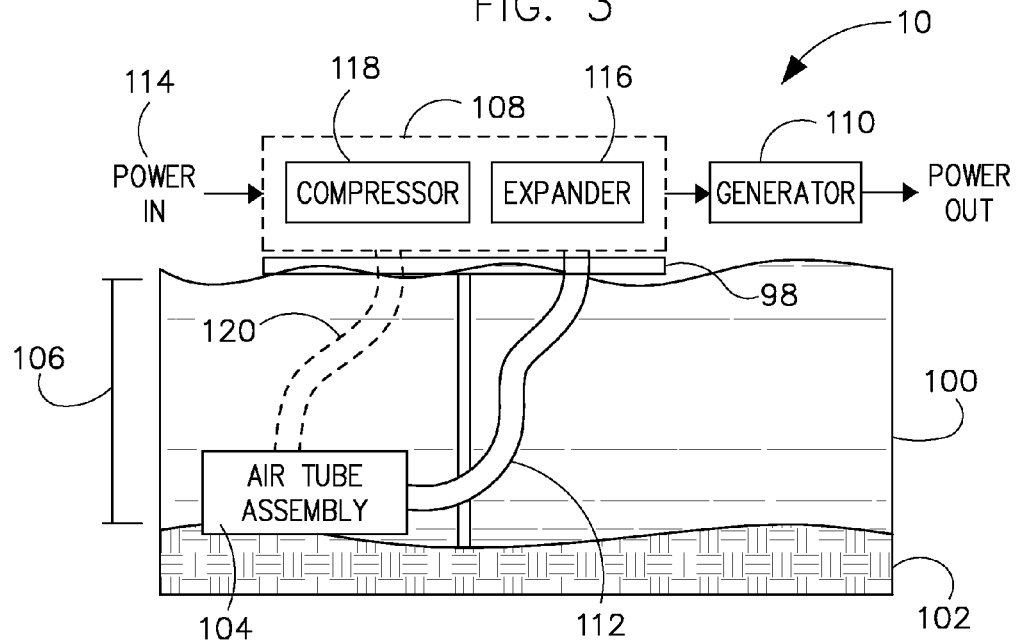
FIG. 3 is a schematic diagram illustrating basic components of a system positioned at sea according to an embodiment of the invention.

Referring now to FIG. 3, basic components of system 10 positioned at sea are illustrated. Components of system 10 may be positioned on a platform 98 proximately to the water surface. Thus, FIG. 3 illustrates a sea 100 and a sea floor 102. Sea 100 includes an ocean, a lake, or a reservoir such as in a dammed river, and in this and all embodiments is not limited to any specific body of water. System 10 includes a flexible fluid bag or fluid bag assembly 104 positioned at an average depth 106, a unidirectional or bi-directional fluid pressure conversion device or compressor/expander (C/E) 108 coupled to a generator 110, and a heat transfer system (pumps and heat exchangers as discussed with respect to FIG. 1, not illustrated). C/E 108 may include multiple stages of compression and expansion, and a heat exchanger package (not shown) may cool or reheat the fluid between the stages of compression or expansion, respectively. The tubes carrying the pressurized fluid are immersed in circulating water, or more commonly, the pressurized fluid is passed over a finned tube heat exchanger inside which flows inside the finned tubes. System 10 may be configured to operate substantially in nearly-isothermal or adiabatic modes.

One skilled in the art will recognize that system 10 of FIG. 3 may include but is not limited to other devices such as a control system, a computer, and one or more clutches to mechanically couple components thereof. The bag 104 is ballasted so it doesn't float to the surface when inflated.

A fluid hose or pipe, or pressurized-fluid conveyance system 112 connects fluid storage bag assembly 104 with the C/E 108 at or near the surface of sea 100. The C/E 108 is coupled to generator 110, which in one embodiment is the same generator used by a wind turbine, with a clutch (shown in FIG. 4). The generator 110 can act as a motor as well to drive the C/E 108 in compressor mode when storing energy, or if the wind is blowing, the wind power can be put into the generator 110. Thus, when full power from the system is desired, for example during peak demand periods on the grid, the stored fluid expanding through the C/E 108 augments the torque to the generator 110. In embodiments, generator 110 is an (alternating current) A/C generator, and in other embodiments, generator 110 is a (direct current) DC generator.

DC power transmission is not often used for land-based transmission because of the cost of conversion stations between transmission lines. However, the efficiency of DC transmission lines can be greater than A/C lines, particularly under salt water. Other advantages of DC power transmission include a clearer power flow analysis and no requirement to synchronize between independent grid sections connected by the DC line. Additional benefits of DC transmission may be realized when the lines are run underwater due to capacitance of the transmission line. Thus, many DC transmission systems are in existence today.

C/E 108 provides the ability to both compress and expand fluid. In one embodiment, C/E 108 is a single component that includes the ability to compress fluid when work is input thereto and to expand fluid to extract work therefrom. In such an embodiment, a single fluid hose or pipe 112 is positioned between fluid storage tube assembly 104 and C/E 108, and fluid is pumped to and from fluid storage tube assembly 104 using fluid hose or pipe 112. Thus, when power is input 114 to C/E 108, C/E 108 operates to compress fluid, convey it to fluid storage tube assembly 104 via fluid hose or pipe 112, and store the energy therein. Power 114 may be provided via a renewable source such as wind, wave motion, tidal motion, or may be provided via the generator 110 operated as a motor which may draw energy from, for instance, a power grid. Also, C/E 108 may be operated in reverse by drawing compressed stored energy from fluid storage tube assembly 104 via fluid hose or pipe 112. Thus, by reversing its motion, C/E 108 may be caused to alternatively compress or expand fluid based on a direction of operation or rotation. Note that the generator 110 provides electrical power in one embodiment. Alternatively, mechanical power may be utilized directly from the expander without the use of generator 110.

However, in another embodiment, compressor and expander functionalities of C/E 108 are separated. In this embodiment, an expander 116 is coupled to fluid storage tube assembly 104 via fluid hose or pipe 112, and a compressor 118 is coupled to fluid storage tube assembly 104 via the same fluid hose 112, or, alternatively, a separate fluid hose, pipe, or piping system 120. Thus, in this embodiment, power may be input 114 to compressor 118 via, for instance, a renewable energy source that may be intermittent—providing compressed fluid to fluid storage tube assembly 104 via separate fluid hose or pipe 120. In this embodiment, energy may be simultaneously drawn from fluid storage tube assembly 104 via fluid hose or pipe 112 to expander 116. Thus, while providing the system flexibility to simultaneously store and draw power, this embodiment does so at the expense of having separate compressor 118 and expander 116 (additional compressor and expander not illustrated).

Figure 4:
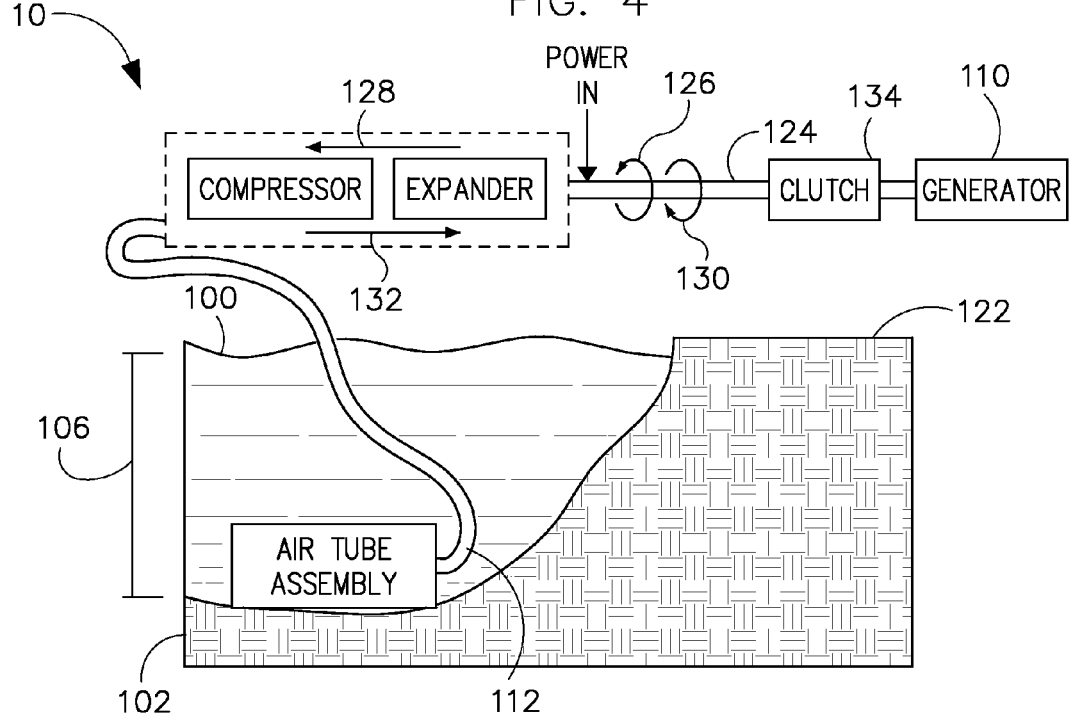
FIG. 4 is a schematic diagram illustrating basic components of a system positioned on land according to an embodiment of the invention.

Referring now to FIG. 4, basic components of system 10 positioned on land are illustrated. Much like system 10 of FIG. 3, system 10 of FIG. 4 is able to receive power from a grid, from one or more renewable energy systems, or both. This system is likewise able to store energy in an underwater isobaric fluid storage bag or tube assembly that is compressed in a C/E device and to extract the energy therefrom also via the C/E device. The system may be configurable to operate in isothermal or adiabatic mode.

An important factor in whether the fluid passageway from the surface to the bag should be rigid or flexible is whether the surface unit is floating or fixed to the sea floor. In deeper water, many RE harvesting schemes use a floating and anchored base. So if the wind or wave direction changes, the position of the base moves until the anchor lines are tensioned in a new direction.

Rigid fluid pipes are generally less expensive since they may be simply steel pipes with diameters that are commonly used in the offshore marine industry. The deployment techniques can be a bit more involved since field joints (those connected in the field, not at the manufacturing yard) will be needed for deep or long pipes. A flexible hose is easier to fabricate completely on shore and deploys more easily, but it requires a more complicated and expensive design. Such hoses have a relatively flexible liner that in one embodiment provides the fluid seal with a braided overwrap of high strength material like metal or fiberglass to carry the pressure load. The diameter of these hoses for a 2.5 MW C/E unit (a size similar to an offshore wind turbine) could be, in one embodiment, about 28 cm in diameter (11") for a bag depth of 100 m and has operating pressures of 1.1 million Pascals (165 PSI). Offshore platforms deal with floating, moored platforms and "rigid" connections to the bottom sediments (e.g., drill shafts), so a flexible hose is not strictly required for such moored platforms. The deflection strains over the length of the pipe could be well inside the limits of the pipe's structural capabilities. Also note that the pressure difference between the fluid inside and the exterior pressure varies with the depth. Near the bottom of the pipe/hose the pressure differences are small, which is why a thin plastic bag can hold the pressurized fluid at the floor, suggesting hybrid or combination solutions where a flexible and fairly unreinforced hose can be used near the bag and a rigid, simple pipe used in the upper sections.

FIG. 4 illustrates a system 10 where components other than compressed fluid transmission and storage are located on land 122. Thus, in this system, capital cost may be reduced by avoiding the cost related to off-shore setup and operation. However, operational locations may be more limited, as it may be desirable to operate in 100 feet of water or deeper. Thus, in order to reach such desirable depths, it may be necessary to convey pressurized fluid over longer distances. Further, it is often desirable for environmental, aesthetic, and other reasons to locate RE power systems well away from populated areas. In addition, renewables such as wind typically provide much greater power at distances removed from land shapes and other wind obstructions. As such, FIG. 4 illustrates a system 10 configured to operate on land according to embodiments of the invention. System 10 of FIG. 4 may incorporate elements of FIGS. 1 through 3 as discussed above. In one embodiment, bi-directional C/E 108 includes a shaft 124 configured to operate in a first rotational direction 126 to compress fluid in a first flow direction 128 during a compression phase causing fluid to pass through fluid hose or pipe 112 to storage. In this embodiment, shaft 124 of C/E 108 may be caused to operate in a second rotational direction 130 that is opposite first rotational direction 126 by expanding fluid from storage and flowing the fluid through C/E 108 in a second flow direction 132. A clutch 134 couples shaft 124 to generator 110, in this embodiment, to enable energy extraction from storage via generator 110 and to de-couple generator 110 when power is input to C/E 108 by a source other than generator 110. And, although bi-directional operation is illustrated with respect to FIG. 4, it is to be understood that all systems disclosed herein may be uni-directionally configured as well.

Figure 5:
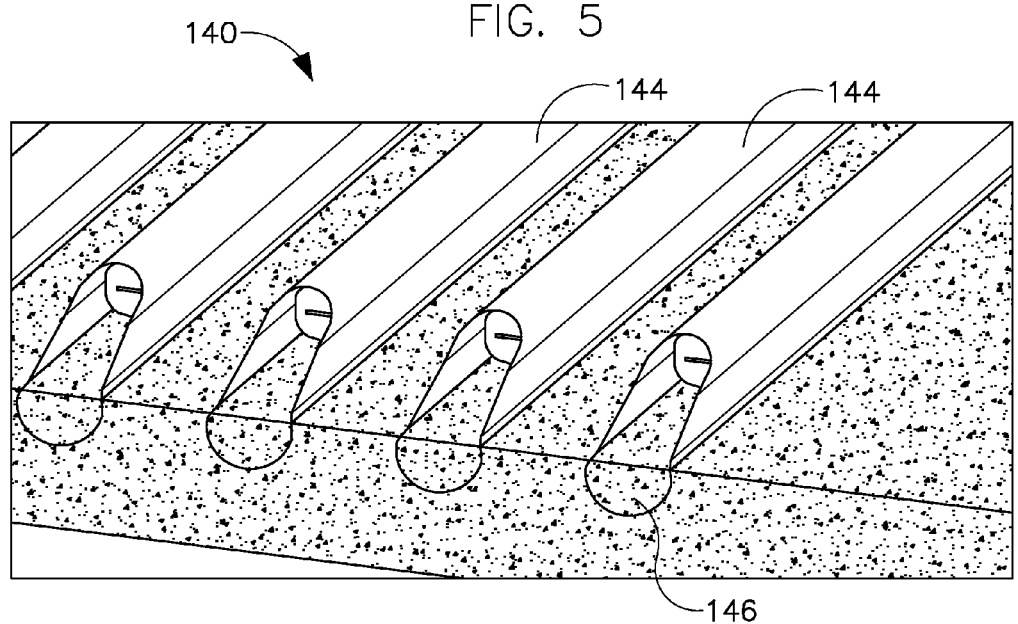
FIG. 5 is an isometric view of a fluid storage tube assembly according to an embodiment of the invention.

FIG. 5 shows a fluid storage tube assembly 140 deployed on a sea floor 142 according to an embodiment of the invention. This type of deployment minimizes vessel structure by using hydrostatic pressure as a restraining force, and the sea provides a heat sink for isothermal operation. While the fluid storage tube assembly 140 of FIG. 5 is shown as having a plurality of fluid vessels, tubes, or bags 144, fluid storage tube assembly 140 may have only one bag 144. The fluid bags 144 are ballasted by putting sea floor sediment 146 inside the fluid storage bags 144 so they do not rise when inflated. The bag 144 has special features to provide extra stability margin for non-level bags or non-uniform ballasting and to isolate the fluid from the seawater and ballast material. In one embodiment, about half of the bag's cross sectional area is filled with silt or sediment 146.

Figure 6:
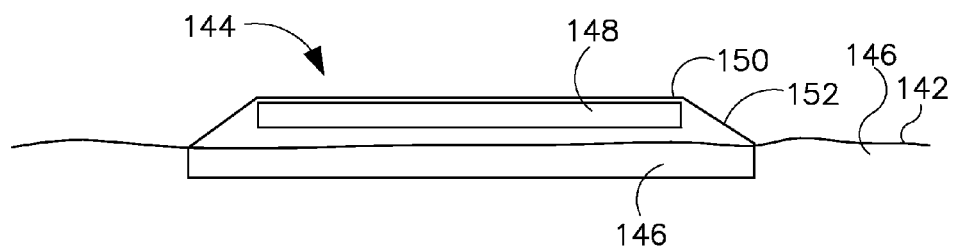
FIGS. 6 and 7 are schematic diagrams illustrating fluid storage tubes according to embodiments of the invention.
Figure 7:
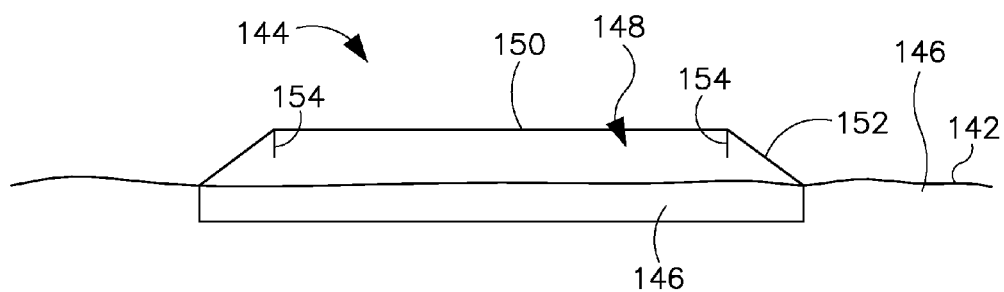

As shown in FIG. 5, fluid storage vessels 144 can be arranged in parallel rows, and multiple bags 144 may make up the fluid storage tube assembly 140. In one embodiment, fluid storage tubes 144 in the assembly 140 are fluidly or pneumatically coupled together in a parallel arrangement such that compressed fluid flowing into and out of the fluid storage tube assembly 140 may be divided among all of the fluid storage tubes. Referring to FIGS. 5, 6, and 7, fluid storage tubes 144 include a fluid chamber 148 inside an open-ballast ballast bag 150 and include tapered ends 152. In embodiments, the fluid chamber 148 may be open to the ballast bag 150 or closed to the ballast bag 150. The tapered ends 152 allow ballasting of the bags 150 to extend past fluid chamber 148 that contains the compressed fluid. In conjunction with an end cap 154, the tapered ends 152 help reduce sediment ballast loss. The opposite ends of the fluid storage tubes 144 may also be open to water flow and tapered or closed as described herein.

Figure 8:
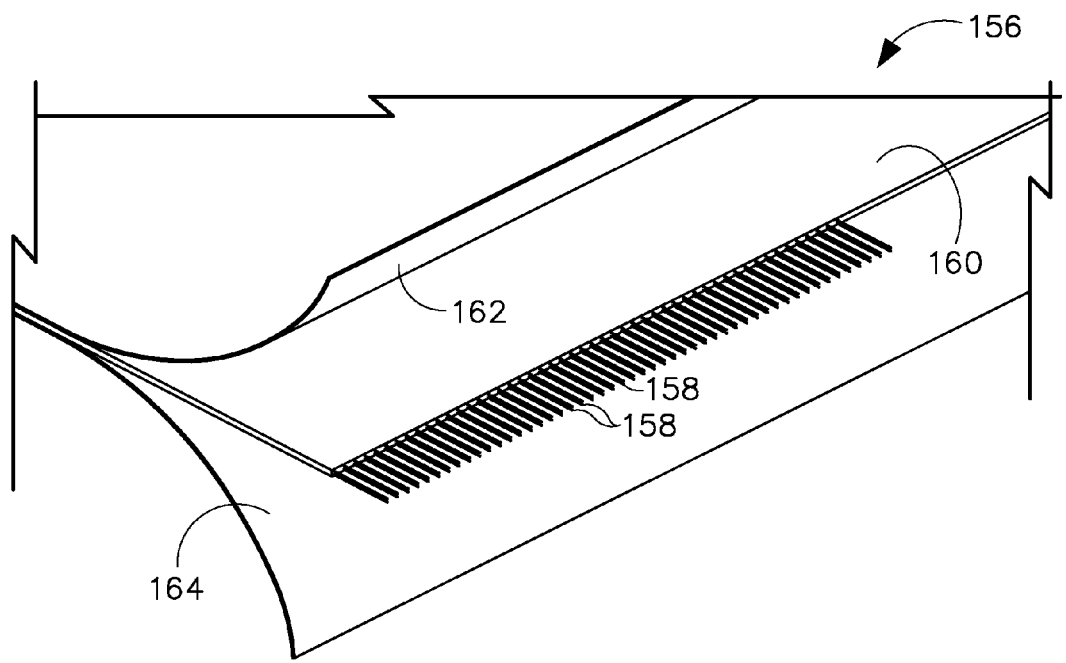
FIG. 8 illustrates components of a material used to form a fluid storage tube according to an embodiment of the invention.

The underwater fluid storage vessels 144 are designed to be constructed at much lower costs than that of comparable steel or composite pressure vessels while accommodating expected structural loads and while having seafloor endurance of many years. FIG. 8 illustrates an example of a material used for constructing a fluid storage tube according to an embodiment of the invention. FIG. 8 is not necessarily drawn to scale. The fluid storage tubes described herein may be constructed of a film or wall material that is a fiber reinforced polymer matrix 156 of, for example, ~55% fibers 158 encapsulated (such as by hot rolling, for example) in layers of common thermoplastic 160 on both sides. Such a matrix 156 structure may be about 0.14 mm thick (0.055"), for example. This type of matrix 156 allows for a thin, inexpensive, scalable, and very robust vessel for marine applications. The thermoplastic material 160 may be plastics such as LDPE (low-density polyethylene), HDPE (high-density polyethylene), PVC (polyvinyl chloride), PET (polyethylene terephthalate), or polyester, as well as a fluoropolymer. Other materials are also contemplated. The material may also be made of mixed material plastics or of recycled plastic from fluid storage tubes removed from use or operation, for example, where such fluid storage tubes are removed from an installation so as to leave nothing of the removed fluid storage tube at the installation site. Other recyclable plastic sources are also contemplated.

The fibers 158 may be constructed from materials such as glass, carbon, or metal fibers, for example, and are oriented into a directional composite laminate, the direction of which may correspond to one or more directions of principal stress, as an example. Fiberglass, for example, is very inexpensive and is generally very tolerant of long-duration water immersion. Fiberglass is also widely used in the marine industry specifically for its durability, reliability, longevity, suitability for the marine environment, and tolerance of saltwater. Various types of glass fibers each have their own advantages in different applications. In one example, the glass fibers may be a relatively expensive S-2 glass material, which may be optimized for tensile strength. In another example, the glass fibers may be an E-glass material.

The fiber 158 is an important structural element in the composite vessel 144. The tensile strength of the fibers may be on the order of one-hundred times higher than the thermoplastic matrix that will be used. The tension of the fiber opposes the buoyancy force of the fluid with the weight of the sediment ballast and the resultant tangential stress in the vessel. These tensions need only be carried around the diameter of the tube. Hence a tube of a few meters diameter experiences stresses over a distance of a few meters even if the tube is hundreds of meters long. This stress localization allows for thin, cost-effective fibers and polymer matrix while still holding many thousands of tons of ballast and buoyancy within a single tube. For any fiber material used, the design protects the fiber 158 from the sea water. Attempting to achieve the material strength from the plastic alone would substantially increase the cost of manufacture, and the resulting thickness would not be adequately flexible.

The matrix material of thermoplastic fiber reinforced polymer matrix 156 actually exposed to seawater has been extensively used in seawater environments. The fibers 158 will not be directly exposed to seawater under normal conditions, since they are embedded in the thermoplastic fiber reinforced polymer matrix 156 and then laminated top 162 and bottom 164 to fully encapsulate the fibers 158. The material for outer laminations 162, 164 is generally the same as thermoplastic material 160 in thin "face sheets" to fully encapsulate fibers 158.

An important function of each fluid storage tube 144 is to provide a vapor or physical separation barrier for the compressed fluid inside. The pressure difference driving the fluid through the wall of the fluid storage tube 144 to the outside environment is generally very low. That is, since the fluid is stored at hydrostatic equilibrium, there is very little pressure differential to push the fluid through the membrane 156. The fluid storage tubes 144 are designed such that they have stability in salt water for many years, flexibility at the near freezing temperatures found in deep water, and low manufacturing and deployment costs.

The fiber reinforced polymer matrix 156 material is also designed to be repairable. For example, if a hole or a tear develops in the material 156, the hole may be patched by re-joining the material 156 around the hole or by attaching a patch of the same material or another attachable patch to the material around the hole. In the case of deep deployment, such a patch may be applied by a remotely operated vehicle instead of a diver.

Figure 9:
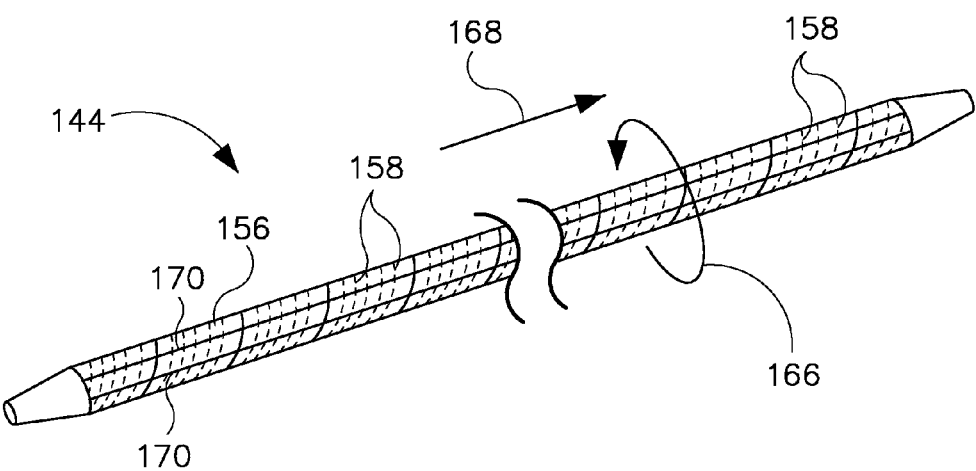
FIG. 9 illustrates a tube fabrication technique according to an embodiment of the invention.

FIG. 9 shows a tube fabrication technique according to an embodiment of the invention. A very long bag 144 can be fabricated from a single sheet of glass-reinforced plastic 156 using a spiral weld technique. Fluid storage tubes of any length and of any diameter may be constructed using a spiral weld technique—where one continuous sheet of glass-reinforced plastic is lap-welded edge-to-edge in a spiral pattern or direction to form the tube. The diameter may be predetermined based on a function of stress of the fluid storage tube material. The strong fibers 158 in the encapsulated matrix are generally uniaxial fibers and are oriented in the encapsulated matrix sense that, during the fabrication process, the fibers 158 are positioned more closely along the circumferential or theta direction 166 of the fabricated tube than along the central or axial tube axis 168. For example, the fibers 158 are positioned to achieve greater strength in the theta direction substantially around the cylindrical tube axis than in the direction substantially parallel to the central cylindrical axis. In this manner, the fibers 158 generally pass circumferentially around the hoop of the cylinder and so have much larger bend radii. This may allow for an easier deployment in an annular configuration.

In addition, axial fibers 170 secondary to the primary encapsulated fibers 158 may be oriented more in parallel to the long axis 168 of the fluid storage tube 144 to help manage secondary stresses in the secondary stress direction 168 along the cylinder axis.

Figure 10:
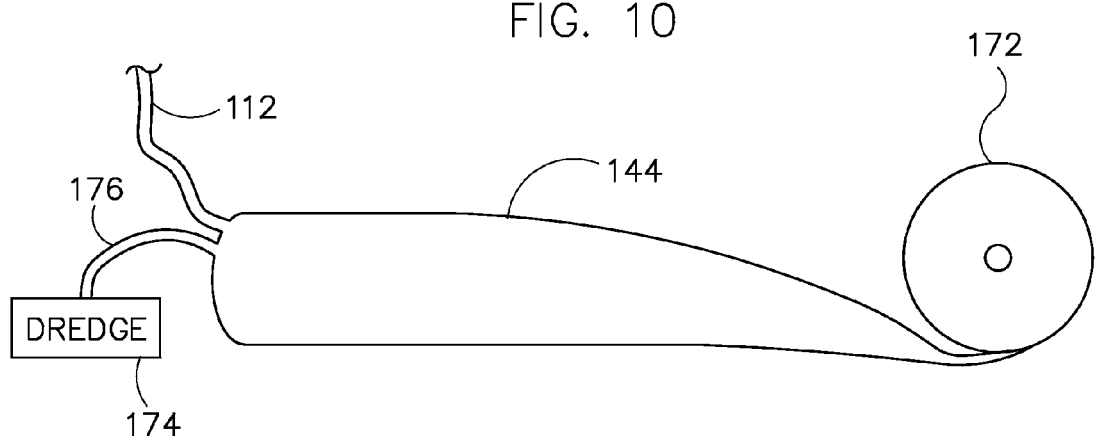
FIG. 10 graphically illustrates a technique for deploying a fluid storage tube according to an embodiment of the invention.

FIG. 10, a technique for deploying a fluid storage tube 144 is shown according to an embodiment of the invention. Fluid storage tube 144 is rolled up onto a spool assembly 172 that may be much heavier than water. When deployed, fluid hose 112 and a dredge 174 are attached to an end of the fluid storage tube 144 via a hose 176. When the dredge 174 and fluid storage tube 144 are positioned on the sea floor, the dredge 174 is controlled to extract a mixture of sediment and water from the sea floor and to introduce the sediment mixture into fluid storage tube 144, which causes fluid storage tube 144 to unroll from spool assembly 172. Once the tube 144 is fully inflated with the sediment mixture, the sediment inside tube 144 is allowed to settle to the bottom of tube 144 to provide the ballast to maintain the tube 144 on the sea floor, and the connection to dredge 174 is removed. In addition, fluid hose 112 is coupled to a system compressor/expander as shown, for example, in FIGS. 2-4. In an alternate embodiment, once spool 172 is unrolled, tube 144 is open on the far end, permitting more dredge material to pass through tube 144 and settle out in the tube as more mixture passes through the length of tube 144 and out the far end of tube 144. In another embodiment, the dredge equipment could be surface mounted, collecting sediment from near or far from the bag and pumping it into the fluid storage vessel, powered from surface powered motors or engines. In yet another embodiment, fluid hose 112 and the dredge hose 176 comprise a single tube, first for dredge material and later for compressible fluid.

Deployment in this manner helps keep deployment costs low. The deployment is designed to be done completely from the surface of the water such that the need for divers may be avoided. Assembly of such a deployment apparatus can be performed on the deck of a vessel at the water surface and then deployed to the sea floor. The fluid storage tubes 144 are rolled up on spool assemblies 172, with either dissolvable or timed releases or similar releases as are known to those of skill in the art. While FIG. 10 illustrates a fully closed end of fluid storage tube 144, a fluid bag having an end cap as disclosed herein is also contemplated such that an interior volume of the bag may fluidly communicate with the water outside tube 144, for example at the far end of tube 144 once fully deployed (not shown).

Figure 11:
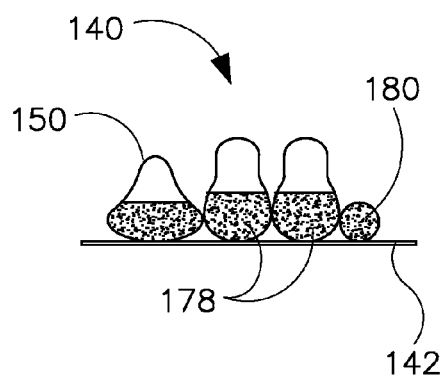
FIGS. 11, 12, 13, and 14 illustrate embodiments of the invention contemplated for deploying a fluid storage tube assembly on a sea floor according to an embodiment of the invention.

FIGS. 11-14 illustrate embodiments of the invention contemplated for deploying a fluid storage tube assembly 140 on the sea floor 142. As shown in FIG. 11, a plurality of open-ballast ballast bags 150 is deployed side-by-side on top of the sea floor 142. Bags 150 may be filled with sediment 178 via the technique described in FIG. 10, for example. A sediment-only ballast bag 180 may be positioned on one or both ends of the fluid storage tube assembly 140 to provide support for the end fluid bags to minimize deformation of the cross-sectional profile, and may also provide additional ballast for the other fluid tubes.

Figure 12:
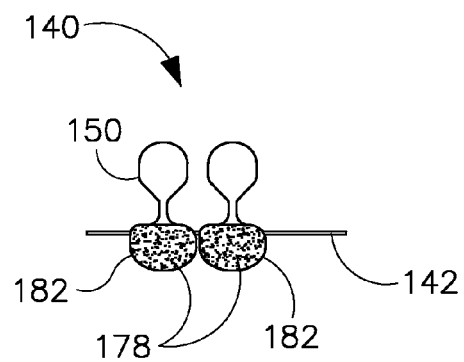

FIG. 12 shows a plurality of closed fluid tubes 150 with open ballast exposed to the internal fluid, deployed side-by-side and partially embedded in the sea floor 142. For example, as part of the dredging used to put sediment into the tubes 150, the technique described with respect to FIG. 10 may include dredging a channel 182 for the tubes 150 to rest in. Then, deployment of the tubes 150 from spool assembly 172 includes deploying tubes 150 such that tubes 150 lie within the formed channels 182. In this manner, the cross-sectional profile of the sediment portion of the tubes 150 is maintained close to floor 142, and separate transverse anchoring ballast bags 180 are not needed. The configuration of FIG. 12 can also be achieved by gradually displacing sediments underneath the fluid tubes 150, causing them to sink into the floor 142.

Figure 13:
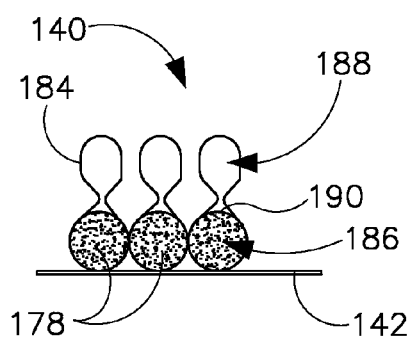
Figure 14:
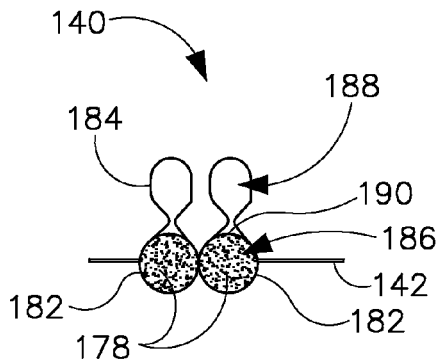

FIGS. 13 and 14 show side-by-side deployment of closed-ballast ballast bags 184 in similar arrangements as bags 150 shown in FIGS. 11 and 12. Closed-ballast ballast bags 184 include a sediment portion 186 sealed from a fluid or dome portion 188 via a membrane 190. Having the sediment portion 186 sealed from the fluid portion 188 takes advantage of strain in the bag 184 to minimize a flattening out or a changing of the shape of the ballast in non-buried installations. The sealed sediment portion 186 also minimizes ballast loss as pressurized fluid enters and exits the fluid portion 188. Shapes of the fluid storage vessels will vary whether the compressed fluid section is sealed off from sea-water or not. The nearby water adjusts its position and the resulting stress on the bag in different ways depending on whether water is inside or outside the vessel walls. Both embodiments are practical (water inside the vessel or not).

Figure 15:
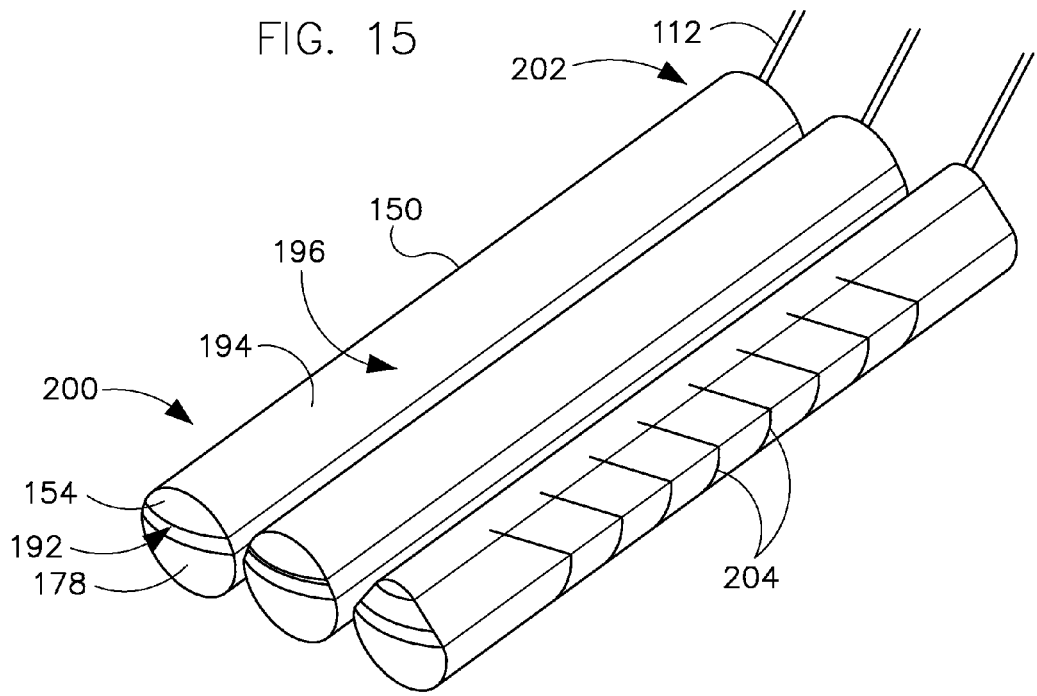
FIGS. 15 and 16 are isometric views illustrating surface area changes with respect to different fill levels of a volume of stored compressed fluid in a fluid storage tube according to an embodiment of the invention.
Figure 16:
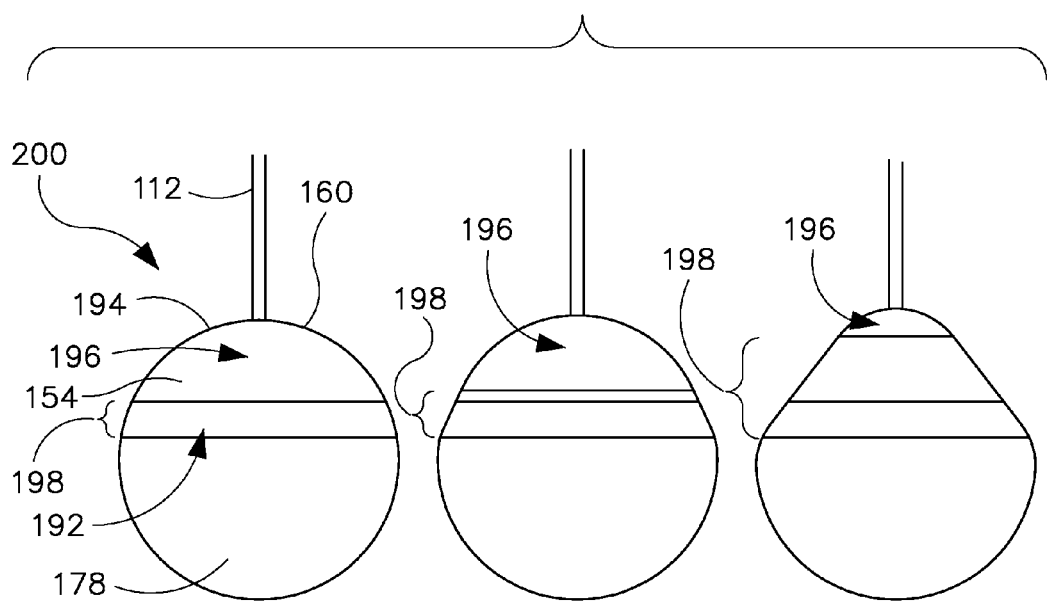

FIGS. 15 and 16 illustrate surface area changes with respect to different fill levels of the volume of stored compressed fluid in a fluid or dome portion of an open-ballast ballast bag 150 that is partially submerged in the sea floor according to an embodiment of the invention. FIG. 16 shows a tail end of the bag shown in FIG. 15 at different fill levels of compressed fluid and water. The end cap 154 is designed to let water and fluid pass through a bag opening 192 according to a change in the volume of compressed fluid inside a dome 194 of the bag 150. As compressed fluid 196 enters into tube 150 via fluid hose 112, water 198 is displaced out of tube 150. If the volume of compressed fluid 196 in tube 150 causes the compressed fluid 196 to reach the bottom of the tail end cap 154, compressed fluid 196 is vented into the outside environment water through bag opening 192. As the volume of compressed fluid 196 decreases inside tube 150, water 198 enters under the tail end cap 154 to replace the volume of compressed fluid 196. Also, excess compressed fluid 196 may also escape through the bag opening 192.

The size of the bag opening 192 (together with any angled slope along the bag length) help determine the amount of compressed fluid 196 that the dome 194 can hold. The tail end 200 of the bag 150 may be installed lower than its head end 202. As shown in FIGS. 15 and 16, there is no significant increase in the surface area of the bag 150 with an increase of volume of compressed fluid 196 stored due, in part, to water pressure acting on the bag 150 and the tendency of the wall of the bag 150 to avoid being folded. The fluid storage bag 150 contains sediment 178, water 198, and compressed fluid 196. As the compressed fluid volume increases, the water volume decreases, resulting in little change in surface area or total volume except the change in volume that occurs as the bag 150 changes shape slightly with more compressed fluid 196 in the bag 150. As the bag 150 fills further, the volume of compressed fluid 196 within the bag increases, but the surface area of the bag 150 changes very little.

The bag 150 flexes as volume of fluid 196 inside changes, but generally without sharp creases or bends even at minimum and maximum inflation. Accordingly, the fluid tube 150 is flexible but does not collapse when fluid 196 is removed therefrom. These features help to avoid creases that could become a focal point for erosion and biofouling abrasion.

FIG. 15 also illustrates that one or more partitions 204 that may be positioned along the length of the bag 150 in a sediment portion of the bag 150 to reduce dynamic instability. The partitions 204 separate the sediment 178 into a plurality of regions to reduce or eliminate the shifting of sediment 178 from one end of the fluid storage tube 150 to the other. This approach minimizes longitudinal shifting of the sediment 178. The partitions 204 may comprise polymer, fibers, cement, concrete, or other materials known in the art.

The partitions 204 may be affixed to the walls of the bag or fluid storage tube 150, or may be held in place by their mass and/or the mass of the nearby sediment 178.

Figure 17:
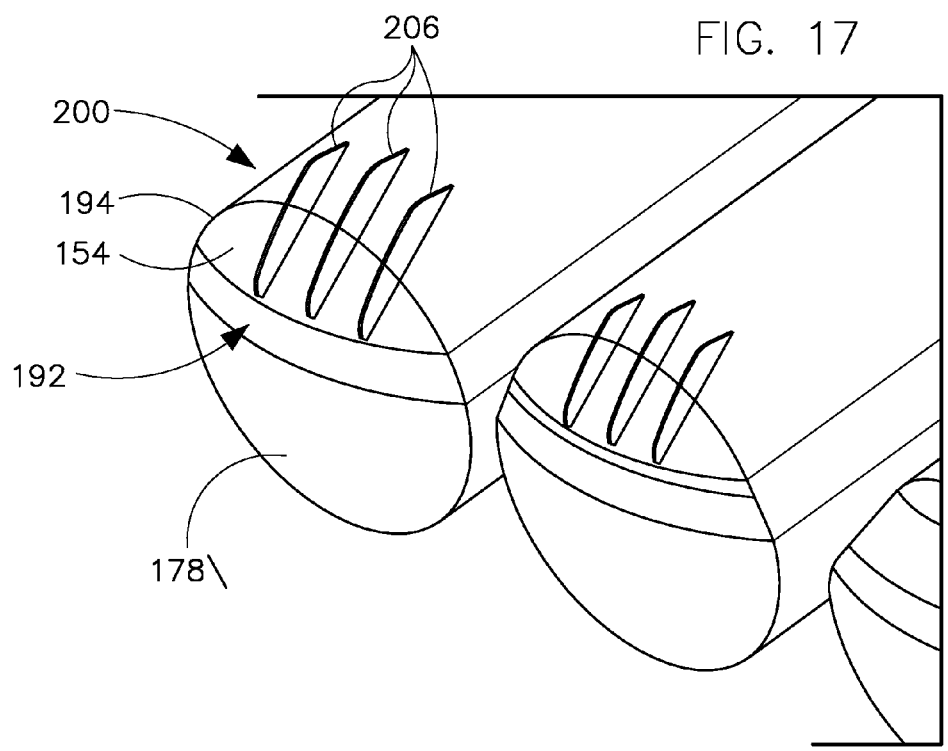
FIG. 17 is an isometric view illustrating structural supports for a fluid storage tube according to an embodiment of the invention.

FIG. 17 illustrates a plurality of gussets 206 coupled to the tail end cap 154 and to the dome 194 at the top part of the bag 150. The gussets 206 allow the dome shape to fold against the top of the vessel 150 when rolled up for deployment, and when unrolled, the dome 194 is supported by these gussets 206.

Figure 18:
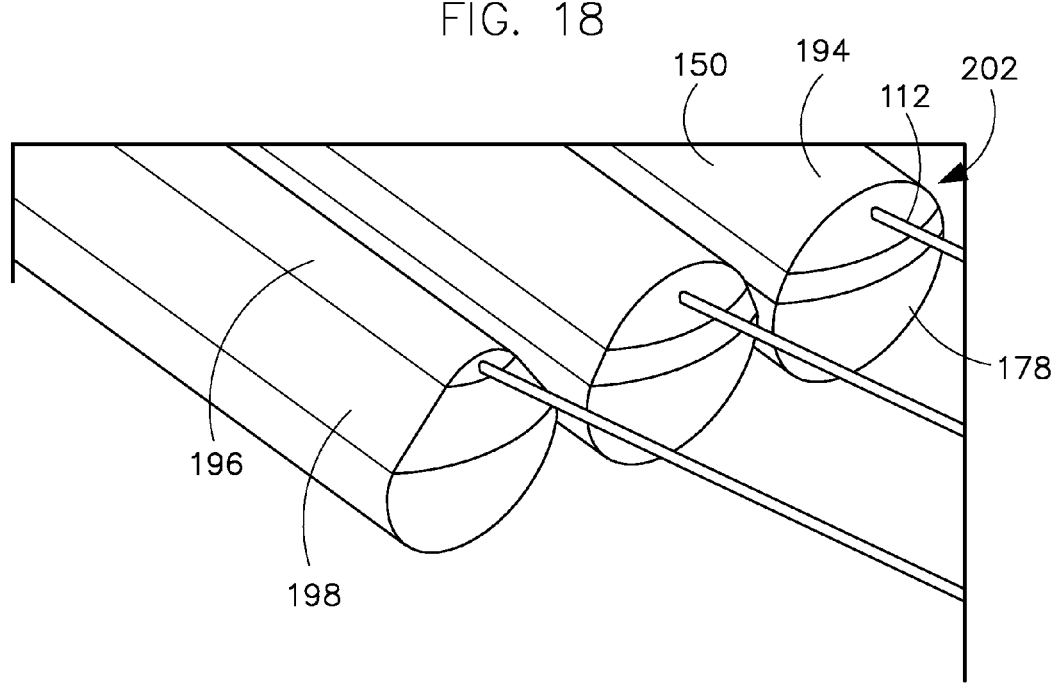
FIG. 18 is an isometric view illustrating shape changes with respect to different fill levels of a volume of stored compressed fluid in a fluid storage tube according to an embodiment of the invention.

FIG. 18 illustrates a head end 202 of the bag 150 shown in FIG. 15 according to an embodiment of the invention. As shown, the fluid hose 112 is attached to and inserted into a closed head end 202 of the bag 150 such that an entry and exit interface of the compressed fluid and fluid hose occurs at the head end 202 of the dome 194. The closed head end 202 is fabricated using, for example, lap welding or other techniques known in the art to create a dome-type shape so that creases or folds are avoided when the volume of compressed fluid inside the bag 150 is low.

In one embodiment, fluid storage tubes 150 of FIGS. 15-18 may be deployed in a down-slope bias from head to tail such that the tail ends 200 of the fluid storage tubes 150 are deployed at a greater water pressure than the head ends 202. In situations where the environment permits, the tail end 200 of the bag can be laid slightly down a gradient. The tail end 200 of the bag 150 could even be left open to the seawater. When the bag 150 is inflated, water exits the tail 200 of the bag 150, whereas when the compression fluid is extracted from the bag 150, water reenters the tube to preserve overall bag volume. In the case where an entire 500-meter, 6-meter diameter bag 144 is laid on a 2% down slope, this geometry enables 85% filling of the fluid bag 144 before overflow starts. Thus, the fluid bag 144 is not sealed, but remains hydrostatically stable at 85% inflation volume. The top of the bag 144 is not exposed to an overpressure greater than several psi. Any overfilling results in benign bubbles floating to the surface of the sea rather than a bursting of the bag 144.

In addition, the insertion/deployment tool may insert the tail end 200 of the bag 144 deeper into the sediment than other bag sections to essentially induce a localized slope in the last part of fluid vessel 144. So even if the slope is very shallow or essentially level, the fluid water line in this end 200 of the bag 144 can be adjusted upwards to move that boundary away from the edge of the end cap 154. In this manner, the end 200 can also be shaped to have features somewhat like a p-trap in a household drain, as known in the art. This would allow water to flow through in a managed way, but trapping the fluid inside. In this embodiment, the end 200 can be installed along a down slope of a ravine, trench, or other depression. In one embodiment, the trench may be created prior to deploying the fluid bag 144. If desired, an additional feature can be added to provide a water passage way through this depressed end 200 to ensure good water flow in and out of the bag 144.

FIG. 19 illustrates a vertical bias deployment of a fluid tube assembly 208 according to an embodiment of the invention. Fluid tube assembly 208 is shown deployed on a sea floor having an uphill slope direction 210. A central fluid hose 212 is generally positioned along the slope direction 210, and the fluid tubes 214 of fluid tube assembly 208 are coupled thereto via a plurality of branch hoses 216. Central fluid hose 212 couples fluid storage tube assembly 208 to a system compressor/expander as shown, for example, in FIGS. 2-4. Fluid tubes 214 may be constructed according to embodiments of the invention described above having a sealed head end 218 and an open tail end 220. Compressed fluid from central fluid hose 212 enters head end 218 and returns to central fluid hose 212 through head end 218. If compressed fluid entering through head end 218 causes the volume of compressed fluid in fluid tube 214 to exceed a storage volume, excess compressed fluid is allowed to escape into the surrounding body of water. Introducing a vertical bias by positioning tail end 220 of fluid tubes 214 at a higher water pressure (and thus at a greater water depth) than the head end 218 allows a greater quantity of compressed fluid to be stored in fluid tube 214 (in the example of an open tail end) as compared with a horizontally positioned fluid tube. In addition, an arrangement of the fluid tubes 214 in such a herringbone pattern may allow a larger fraction of the stored compressed fluid to be recovered and used to generate power.

FIG. 20 illustrates a vertical bias deployment of fluid tube assembly 208 of FIG. 19 according to another embodiment of the invention. Fluid storage tube assembly 208 is shown deployed on a sea floor ridge having a first uphill slope direction 222 on one side and a second uphill slope direction 224 on the other side. In this manner, tail end 220 of fluid tubes 214 is positioned at a higher water pressure than the head end 218. In addition, each fluid storage tube 214 is coupled to a dedicated fluid hose 226 that extends to couple each fluid storage tube 214 to a system compressor/expander as shown, for example, in FIGS. 2-4. In another embodiment, it is contemplated that fluid storage tube assembly 208 shown in FIG. 20 may instead be coupled to the system compressor/expander using a central fluid hose and branch hoses as described above with respect to FIG. 19. Further, it is contemplated that fluid storage tube assembly 208 shown in FIG. 19 may be coupled to the system compressor/expander using dedicated fluid hoses as described with respect to FIG. 20.

Embodiments of this underwater invention have broader potential application than underground CAES. It can be located offshore, in proximity to nearly all major coastal population centers, and also can be located in lakes and reservoirs in proximity to inland population centers. CAES systems typically include sites with suitable geologic formations, which are often not available in close proximity to many major power sources, load centers or transmission lines. Transmission line congestion and capacity constraints make it impractical to locate energy storage facilities long distances from load centers. Therefore, underground CAES is geographically more limited, not having the potential to provide a ubiquitous solution to grid-scale energy storage needs.

Embodiments of the invention include design and operation with existing marine RE systems that include but are not limited to conventional wind power, hydro kinetic systems such as wave and sub-sea turbines, and Ocean Thermal Energy Conversion (OTEC) systems. However, in addition, embodiments of the invention include standalone storage systems that can be remotely located in a marine environment, which do not take advantage of existing RE systems.

Further, in order to reduce or eliminate negative impacts of RE systems, in one embodiment, bags are deployed to a benthic zone. Typically, the benthic zone is an ecological region of a body of water such as an ocean or lake having organisms that live therein called benthos. Benthos generally live in close relationship with a bottom or floor of a body of water, many of which permanently attach to the bottom. The benthic region begins at a shoreline and extends downward along a surface of the continental shelf. At the continental shelf edge, typically approximately 200 meters deep, a deepening gradient begins that is known as the continental slope extending deep to the sea floor. Thus, according to embodiments of the invention, it is desirable to deploy systems in the benthic zone but at depths below which photosynthesis is generally possible, minimizing biofouling due to photosynthetic organisms. Materials of construction are generally non-toxic. Small fractions of a sea floor may be dedicated to storage to provide substantial habitat for benthic organisms while also achieving storage capacity objectives.

If CO2 comprises the working fluid, the large free surface with the seawater would cause much CO2 to dissolve in the seawater. Such dissolution at depth comprises sequestration of the CO2 gas in deep seawater, the ultimate destination of most anthropogenic carbon from the atmosphere. Those of skill in the art in physical oceanography would recognize that water at depths of 500 meters or greater, for example, has typical outcropping timescales of hundreds of years, both from effects of lateral advection to the poles of the Earth or from vertical diffusion across the stable seawater density gradient. Such timescales are longer than the U.N.F.C.C.C requirement of 100 years to qualify for a carbon credit. Therefore, such an approach comprises an effective method of CO2 sequestration for the fraction of CO2 dissolved in deep seawater in this manner. The remaining fraction would be available to recover energy.

Therefore, in accordance with one embodiment of the invention, a compressed fluid storage system comprises a fluid containment vessel positioned on a floor of a body of water, wherein the fluid containment vessel comprises sediment positioned therein to ballast the vessel on the floor.

According to another embodiment of the invention, a method of deploying a compressed fluid storage system includes pumping a sediment mixture into a flexible fluid storage bag, wherein the sediment mixture comprises sediment acquired from a floor of a body of water. The method also includes allowing the sediment mixture to settle in the flexible fluid storage bag such that sediment from the sediment mixture ballasts the flexible fluid storage bag on the floor and coupling the flexible fluid storage bag to a compression unit via a fluid hose, wherein the compression unit is configured to deliver compressed fluid to the flexible fluid storage bag for storage.

According to yet another embodiment of the invention, a compressed fluid storage system includes a fluid storage system positioned on a floor under a body of water, the fluid storage system comprising a plurality of flexible fluid storage tubes partially filled with a sediment ballast. A fluid pressure conversion system is included that is configured to pressurize a quantity of fluid from a first pressure to a higher, second pressure. The system also includes a power source coupled to the fluid pressure conversion system and configured to cause the fluid pressure conversion system to pressurize the quantity of fluid and a pressurized-fluid conveyance system configured to pass pressurized fluid between the fluid pressure conversion system and the fluid storage system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of deploying a compressed fluid storage system, the method comprising:
   pumping a sediment mixture into a flexible fluid storage bag, wherein the sediment mixture comprises sediment acquired from a floor of a body of water;
   allowing the sediment mixture to settle in the flexible fluid storage bag such that sediment from the sediment mixture ballasts the flexible fluid storage bag on the floor;
   coupling the flexible fluid storage bag to a compression unit via a fluid hose, wherein the compression unit is configured to deliver compressed fluid to the flexible fluid storage bag for storage; and
   deploying the flexible fluid storage bag at a depth within the body of water such that the flexible fluid storage bag can store the compressed fluid at a pressure that provides for use of the compressed fluid in a compressed fluid energy storage application.

2. The method of claim 1 further comprising:
   rolling the flexible fluid storage bag onto a spool; and
   wherein pumping the sediment mixture into the flexible fluid storage bag comprises filling an interior volume of the fluid bag with the sediment mixture such that the flexible fluid storage bag is inflated with the sediment mixture and is unrolled from the spool.

3. The method of claim 1 further comprising dredging the sediment mixture comprising sediment and water from the floor of the body of water.

4. The method of claim 1 further comprising:
   dredging a channel in the floor; and
   positioning the flexible fluid bag within the channel, wherein pumping the sediment mixture into the flexible fluid storage bag comprises filling an interior volume of the fluid bag with the sediment mixture to position the flexible fluid bag within the channel.

5. The method of claim 1 wherein pumping the sediment mixture comprises pumping the sediment mixture into the flexible fluid storage bag via the fluid hose.

6. The method of claim 1 wherein deploying the flexible fluid storage bag comprises deploying the flexible fluid storage bag at a depth within the body of water at which the flexible fluid storage bag is isobarically operated, with a hydrostatic equilibrium being present between a pressure in the flexible fluid storage bag and water pressure outside the flexible fluid storage bag.

* * * * *